Nov. 21, 1961 W. B. EWING 3,009,389
CORRUGATED TYPE SKYLIGHT SHADING
Filed May 12, 1955 5 Sheets-Sheet 1

INVENTOR.
Walkley B. Ewing
BY
ATTORNEY

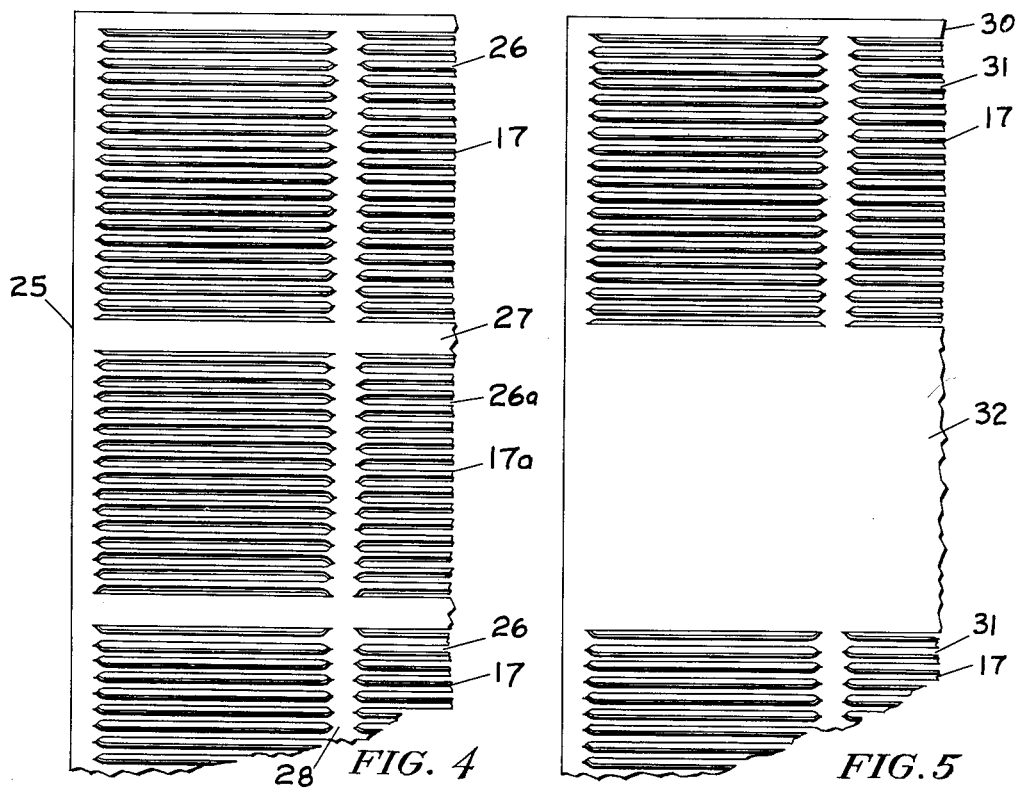
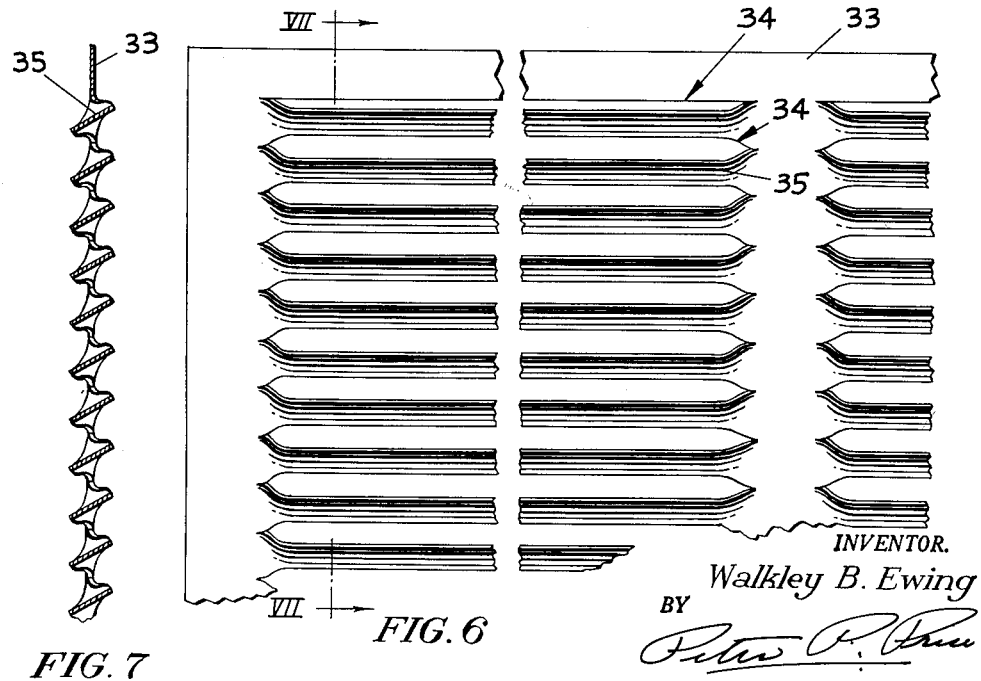

Nov. 21, 1961 W. B. EWING 3,009,389
CORRUGATED TYPE SKYLIGHT SHADING
Filed May 12, 1955 5 Sheets-Sheet 3
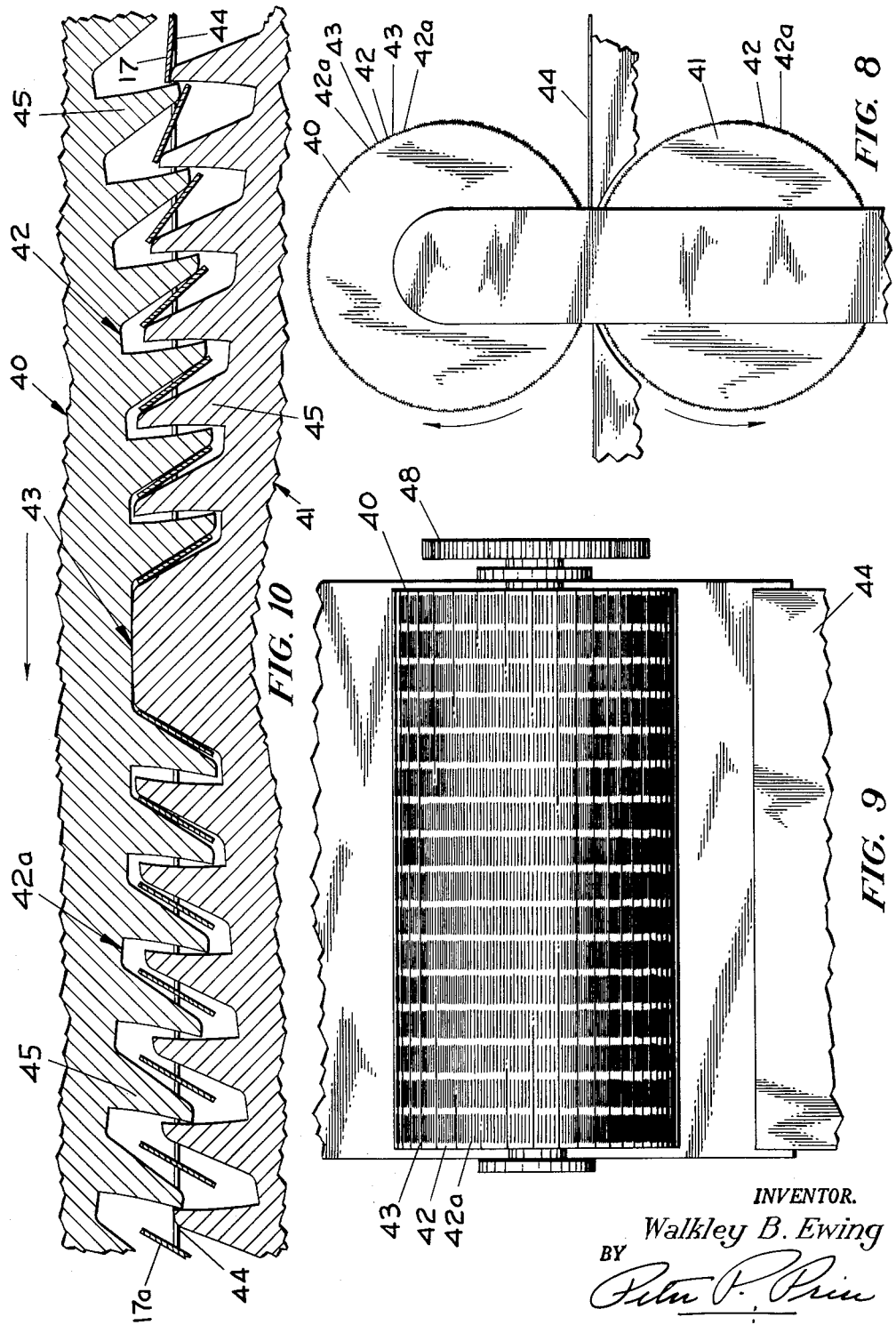
INVENTOR.
Walkley B. Ewing
BY
ATTORNEY INVENTOR.
Walkley B. Ewing
BY
ATTORNEY Nov. 21, 1961    W. B. EWING    3,009,389
CORRUGATED TYPE SKYLIGHT SHADING
Filed May 12, 1955    5 Sheets-Sheet 5

INVENTOR.
Walkley B. Ewing
BY
Peter P. Price
ATTORNEY

United States Patent Office 3,009,389
Patented Nov. 21, 1961

3,009,389
CORRUGATED TYPE SKYLIGHT SHADING
Walkley B. Ewing, East Grand Rapids, Mich., assignor to Ewing Development Company, Grand Rapids, Mich., a corporation of Michigan
Filed May 12, 1955, Ser. No. 507,803
3 Claims. (Cl. 88—57.5)

This application relates to the construction of skylights and more particularly to the provision of means in such skylights adapted to eclipse direct sunlight but to permit the entrance of a substantial portion of indirect sky light generally in the form of diffused light.

One of the major problems in the use of skylights is the fact that they not only admit large quantities of useful diffused sky light but also admit direct sunlight. The sunlight produces both glare and heat. This invention provides an improved structure for eclipsing the direct sunlight. In my co-pending application, Serial No. 436,542, entitled, Improvement in Skylight Shading, filed June 14, 1954, I disclosed a weaving shed type of eclipsing element consisting of a plurality of individual, major louvers interconnected and arranged in pairs in the form of an inverted V. Each of the louvers incorporates a plurality of minor louvers designed to act as the solar radiation intercepting means while admitting diffused sky light. The structure shown in the aforementioned application provides a very satisfactory screening means for application to the exterior of the skylight. It does not, however, provide an eclipsing means entirely suitable for incorporation into a double glazed skylight.

In many localities there are certain distinct advantages to the incorporation of the eclipsing means into the skylight proper. This invention contemplates the enclosure of the light screening means between two sheets of transparent material such as glass or plastic in the form of a sandwich. This arrangement affords physical protection for the screening means. It also prevents the accumulation of dust and dirt upon the screening means. This dirt alters the reflectance characteristics of the louver surfaces and prevents maintenance of the constant reflectance-absorptance ratio essential to the best operating efficiency of the structure. Screening material of this type is difficult to clean because the louvers are comparatively weak and the major louver structure is made up of many fine minor louvers which do not adapt themselves to ready cleaning. Enclosure of the louvers within a glass sandwich eliminates this problem.

In order to enclose the eclipsing members within a double glazed skylight unit, it is essential that the screening material be adapted to the formation of a weaving shed type of structure having a minimum height, to prevent the whole sandwich from becoming excessively thick and costly. In order to prevent the whole unit from becoming excessively costly, it is essential that not only the screening material but its formation into the weaving shed type of structure be adapted to fully automatic manufacture with continuous, high speed machinery.

This invention accomplishes this, and, as a result, permits the use of skylights of dual pane construction of reasonable cost. The use of such a dual pane construction materially reduces heat loss in cold weather, prevents condensation on the interior of the skylight and makes it feasible to assemble and seal the whole unit at a factory under accurate, controlled manufacturing conditions.

With these objects and purposes in mind, those acquainted with the problems of light and heat control in fenestration will understand this invention upon reading the following specification and the accompanying drawings.

In the drawings:

FIG. 4 is a fragmentary plan view of a sheet of the material used for making the eclipsing element illustrated in FIG. 1, before its corrugation.

FIG. 5 is a fragmentary, plan view of a sheet of the material used for making the eclipsing element illustrated in FIG. 2 before its corrugation.

FIG. 6 is an enlarged, fragmentary view of a typical eclipsing element utilized in the practice of this invention.

FIG. 7 is a fragmentary, sectional view taken along the plane VII—VII of FIG. 6.

FIG. 8 is a side elevation view of a die drum equipped machine suitable for forming the sheet material illustrated in FIG. 4.

FIG. 9 is a fragmentary plan view of a die drum equipped machine suitable for forming the sheet material illustrated in FIG. 4.

FIG. 10 is an enlarged, fragmentary, sectional view of the engagement zone of the die sections of the die drums illustrated in FIGS. 8 and 9.

In executing the objects and purposes of this invention, I have provided a sandwich type, dual pane skylight having incorporated between the panes a solar eclipsing element having a plurality of integral panels arranged in generally V-shaped form. At least the north facing of the panels has incorporated into it a plurality of minor louvers set at such an angle that they entirely eclipse direct solar radiation approaching from a predetermined arc of the sky while admitting a major portion of indirect sky light. Where both panels have minor louvers, the minor louvers of the north facing panels are inclined oppositely to the minor louvers of the south facing panels.

To fabricate an eclipsing material which will be economical and structurally capable of retaining its shape, I have provided a machine adapted to the high speed and accurate formation of these louvers in sheet material. One form of this machine utilizes mating die drums adapted to progressively form these louvers. A second machine is adapted to operate intermittently. Both machines are capable of simultaneously forming the louvers in opposite directions. In that form of my invention in which one panel only is formed into minor louvers and the other remains imperforate, these machines may be adapted to minor louver groups spaced apart by blank panels.

In referring to the relationship of the components of this invention as being either north or south, it will be understood that this refers only to the circumstances existent in latitudes north of the equator. The opposite situation will occur in latitudes south of the equator.

Figure 3:
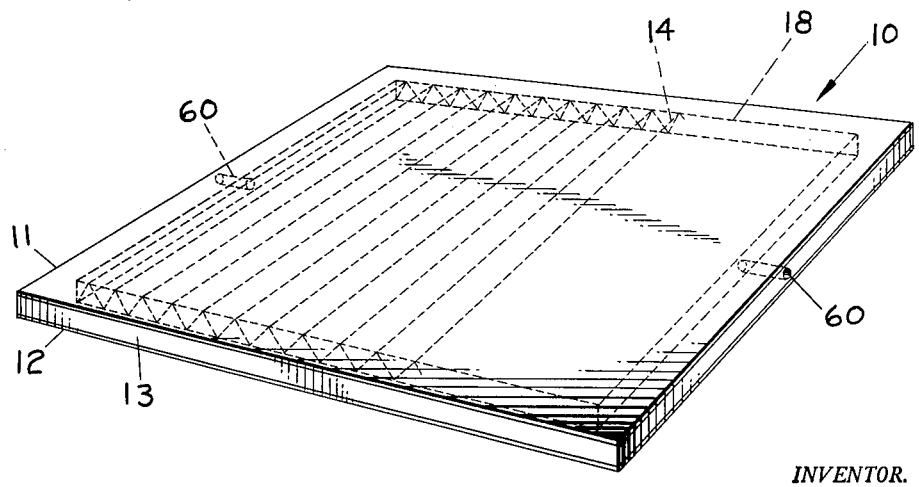
FIG. 3 is an oblique view of a dual pane skylight having an eclipsing member enclosed therein.

Referring specifically to the drawings, the numeral 10 refers to a typical double glazed skylight having an upper transparent sheet 11 and a lower transparent sheet 12. These sheets are supported and joined at their margins by any suitable type of frame structure 13 (FIG. 3). The entire central portion of the skylight 10 is a hollow chamber 18. The eclipsing element 14 is enclosed in the chamber 18.

The eclipsing element 14 is of sawtooth shape. Each tooth of the screen 14 consists of a pair of panels 15 and 16 forming an inverted V with the lower ends of the panels 15 and 16 contacting the lower sheet 12 and the apex of the panels contacting the upper sheet 11. It is not absolutely essential that the ends of the panels contact both sheets 11 and 12. They will contact one of the panels simply by deflection under their own weight. It is preferable that they contact both panels to prevent vertical movement of the eclipsing element.

Figure 1:
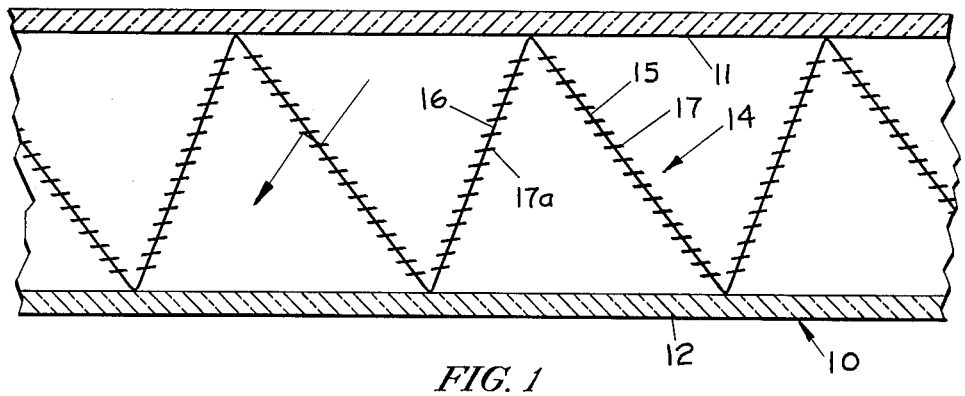
FIG. 1 is an enlarged fragmentary, partially schematic sectional elevational view of a dual pane skylight incorporating one form of this invention.

In the form of the invention illustrated in FIG. 1, each of the panels has a plurality of louvers 17. The louvers 17 of the panel 15 are inclined oppositely to the louvers 17a of the panel 16. Thus, when panels are corrugated into the sawtooth shape, the louvers 17 and 17a have a generally similar orientation in space.

Light approaching the eclipsing element from a major portion of the north quadrant (the quadrant to the right of the element as illustrated in FIG. 1) and from a minor portion of the south quadrant passes through one or both panels. A certain amount of north light is introduced into the enclosure by reflection from the upper surface of one louver 17 to the bottom surface of the next louver above. This light is reflected into the enclosure. To obtain the benefit of this additional light source, the louvers on the north panel 17 preferably have reflective upper and lower surfaces. To prevent this same reflection of solar radiation into the enclosure by the louvers 17a of the south panels, it is considered preferable practice to make at least the top surface of the louvers 17a non-reflective.

Figure 2:
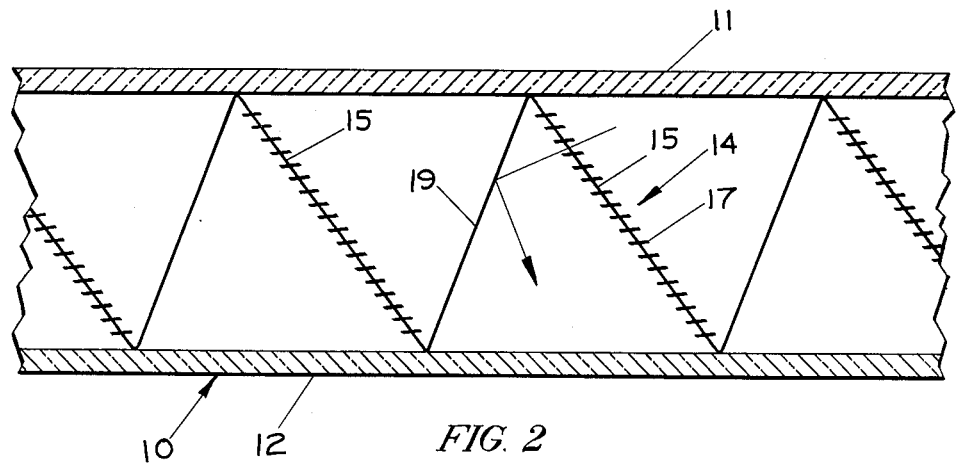
FIG. 2 is an enlarged, fragmentary, sectional elevation view of a dual pane skylight incorporating a modified form of this invention.

In the form of my invention illustrated in FIG. 2, the north panel 15 of each tooth is equipped with louvers 17 in the same manner as the panel 15 in the eclipse element 14. The south panel 19, however, is blank or imperforate. A certain amount of diffused light is introduced directly into the enclosure between the louvers 17. However, a major portion of the diffused light passes between the louvers 17 and is reflected into the enclosure from the inner surface of the south panels 19. The inner surface of the south panels are light reflective to assure maximum use of this light. While the sawtooth eclipse element 14 will exclude all direct solar radiation approaching from any portion of the south quadrant except that which approaches at a very low angle, the eclipse element 14a will exclude all direct solar radiation approaching from the south quadrant. It also increases the quantity of diffused sky light directed into the enclosure by reflection from the south panel of the light entering through the north panel.

To prevent the reflection of solar radiation from the south face of the panel 19 through the louvers 17 of the adjacent north panel 15, it is preferable that the exterior surface of the panel 19 be rendered at least partially non-reflective. The use of these reflective surfaces on the louvers 17 of the eclipse element 14 and on the inside surface of the south panel 19 of the eclipse element 14a may produce bright spots in the sun screen. These reflected highlights can be eliminated by using a diffusing panel for the inside sheet 12. This will also have the added advantage of hiding the screen from interior observation.

FIGS. 4 through 7 illustrate a typical louvered material particularly adapted to use in this type of skylight structure. The material is made from sheet or coiled strip stock of suitable material such as aluminum, steel, copper or bronze. The sheet 25, before passing through the corrugating dies to form it into the sawtooth shape, has a plurality of groups or panels 26 and 26a of louvers formed in it. Although the length and width of each of these louver groups may vary through a wide range, lengthwise the louver groups must each be confined within one panel of the sawtooth screen after corrugation. Thus, if the spacing between the sheets 11 and 12 of the double glazed skylight sandwich 10 is one inch, the louver group of the north panel will have a length of approximately one and one-eighth inches and the louver group of the south panel will have a length of about fifteen-sixteenths of an inch. Between each panel extending laterally of the sheet is a blank area 27 within which the folds of the corrugations are formed. To adequately support the individual louvers 17, supporting strips 28 are provided at suitable spacings laterally of the sheet. Since the south panel of the eclipse element 17 is somewhat shorter than the north panel, it will be noted that the panel 26a in the sheet 25 is shorter than the panel 26.

The number of louvers utilized in each of the panels 26 and 26a will, of course, depend in part upon the length of the panels and upon the size of the louvers. The size of the louvers may vary substantially. This range includes louvers of from one-sixteenth or less to three-sixteenths of an inch or more in width. It will be noted in the sheet 25 that the louvers 17 of the louver group 26 slope in one direction while the louvers 17a of the louver group 26a slope in the opposite direction. In the flat sheet, the louver groups 26 and 26a are arranged alternately. An entire coil of material may be so formed, corrugated into the sawtooth shape and then cut to the length required for the particular skylights involved.

FIG. 5 illustrates as sheet 30 the eclipse element 14a in sheet form. The sheet 30 has a louver group 31 for the north panel. The louver group 31 corresponds to the louver group 26 of the sheet 25. The louver group 31 has louvers 17 indentical to the louvers 17 in sheet 25. The louver groups 31 are separated by long imperforate areas 32 which, when passed through the corrugating die provide the bend areas at the top and bottom of the south panel as well as the blank, south panel itself. In this case the louvers of the louver groups 31 all slope in the same direction.

FIGS. 6 and 7 illustrate in detail a typical structure for the louvers. It will be seen that the louvers are formed by slitting the sheet 33 along a plurality of closely spaced, parallel lines 34. The strips or ribbons created by the slitting are then twisted into louvers 35 inclined at the desired angle and in the desired direction. In forming the louvers 35, the strips are not pressed out in one direction but are rotated about the longitudinal center line of the louver. Thus, equal portions of the louver extend from each side of the sheet. This arrangement facilitates the rapid fabrication of the louvers. It also permits the louvers to be formed with less stretching of the metal in the louvers' formation. The direction of inclination of the louvers is immaterial, it being possible to rotate the louvers with equal facility in either direction once the slits 34 have been made. Stock of any suitable thickness may be used. Preferably, it should be thin, in the order of five one-thousandths to ten one-thousandths of an inch. Aluminum is considered preferable because of its adaptability to this type of forming and corrosion resistance, high reflectivity and comparatively low cost.

FIGS. 8, 9 and 10 illustrate one particular machine adapted to the manufacture of this type of eclipsing element. This machine consists of a pair of mating die drums 40 and 41. The surface of each of these die drums consists of a plurality of sections 42 and 42a having shearing and forming teeth for forming the slits 34 in the sheet and then rotating the strips between the slits into the louvers 35. Each of these sections is separated by a straight portion 43 adapted to leave the blank sections 27 (FIG. 4) between the louver groups. The shearing and forming teeth of each alternate section are sloped in opposite directions in order to produce the oppositely sloped louvers 17 and 17a in the consecutive louver groups 26 and 26a, respectively. Thus, the teeth of the sections 42 slope oppositely to the teeth of the sections 42a. The lower die drum 41 is equipped with mating teeth designed to co-operate with the teeth of the various sections of the upper drum 40.

The rotation of the drums 10 and 41 is co-ordinated by any suitable means such as the gear chain 48. The drums are suitably supported at each end. The supporting structure is conventional and forms no part of this invention. It is, therefore, not illustrated.

As the sheet material 44 is passed between the drums, it is progressively slit and the louvers are rotated into position as is best illustrated in FIG. 8. In FIG. 8, the drums are rotating in the direction of the arrow and thus the sheet material 44 is passing through the machine from right to left. It will be seen that the drums are both equipped with forming teeth 45 having one face sloped to the angle at which it is desired to incline the louvers with respect to the sheet and the other edge slightly concaved to permit the teeth of the upper and lower drums to form a shearing contact as they first engage and thereafter to mesh without conflict. As the teeth 45 initially engage, they shear the sheet material. Thereafter, the progressive meshing of the teeth 45 of the upper and lower drums 40 and 41 rotate the strips into the desired position until, as the sheet passes the vertical axis between the drums, the louvers are rotated to the desired inclination. Preferably this rotation is carried slightly further than it is desired to slope the louvers in order to provide for spring back which is inherent in most metal forming operations.

To facilitate the illustration of the machines' operating principles, the twisted diagonal portion of metal at the end of the louvers has not been shown.

Under certain circumstances it may be desirable or necessary to employ progressive forming. In this case, several pairs of the drums 40 and 41 are employed, each pair performing one step in the formation of the louvers. In this arrangement the first pair of drums may do all the slitting and the remaining pairs the progressive bending or rotation of the louvers.

Figure 11:
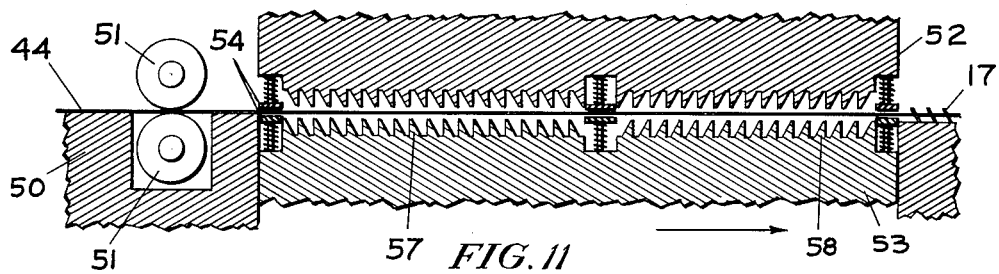
FIG. 11 is a fragmentary, side elevation view of a machine equipped with reciprocating dies adapted to the fabrication of the sheet material illustrated in FIG. 4.

FIGS. 11 through 14 illustrate one embodiment of a reciprocating die capable of forming the sheet material illustrated in FIG. 4. Referring specifically to FIG. 11, the sheet material moves intermittently in the direction of the arrow, that is, from left to right. The sheet material 44 passes over a supporting platform 50 and between a pair of driving rolls 51. It then passes between the reciprocating upper die 52 and lower die 53. The upper and lower dies are both designed to reciprocate vertically and to have equal travel with respect to the sheet 44. This is important because only by this type of movement is it possible in this type die to rotate the louvers 17 about their longitudinal center line within the die.

Figure 12:
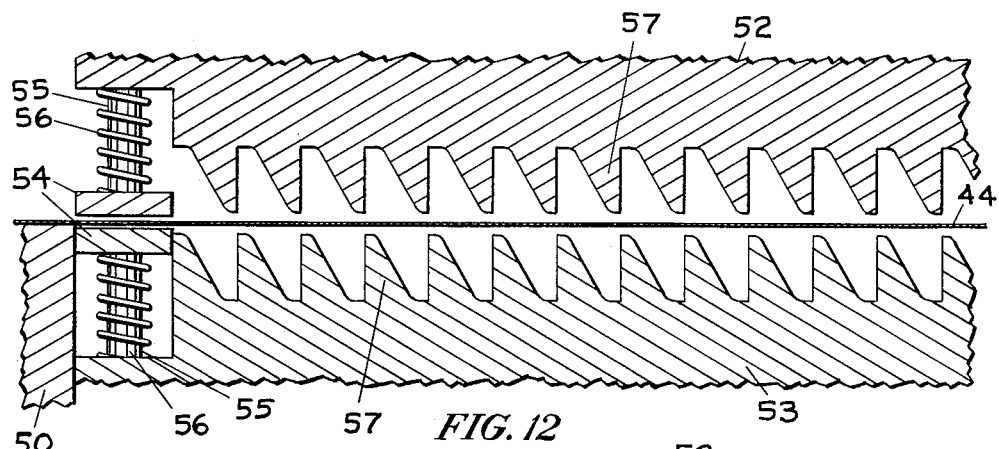
FIG. 12 is an enlarged, fragmentary, sectional elevation view of the dies appearing in FIG. 11 in open position.
Figure 13:
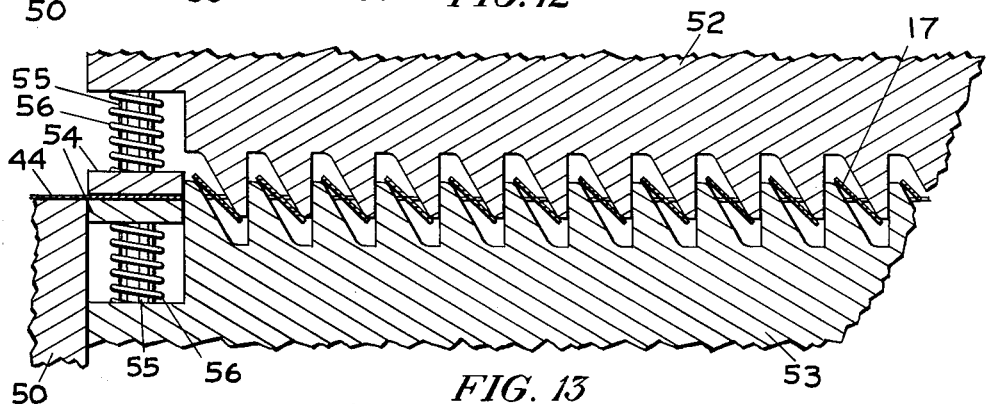
FIG. 13 is an enlarged, fragmentary, sectional elevation view of the dies shown in FIG. 12 in partially closed position.

As the upper and lower dies close, the sheet material 44 is firmly clamped between upper and lower gripping fingers 54. The gripping fingers 54, as best illustrated in FIGS. 12 through 13, are each mounted on a pin 55 which may freely telescope into its associated die. The clamping pressure exerted by the clamping fingers 54 is determined by the compression spring 56 surrounding each of the pins. Thus, by selection of a spring of the correct strength, the proper clamping pressure may be provided for the clamping fingers.

It will be noted in FIG. 11 that the group of teeth 57 on both the upper and the lower dies are inclined oppositely to the group of teeth 58. By this arrangement, the dies 52 and 53 in a single operating cycle are capable of forming two louver groups simultaneously, with the louvers in each group sloped in the opposite direction.

Figure 14:
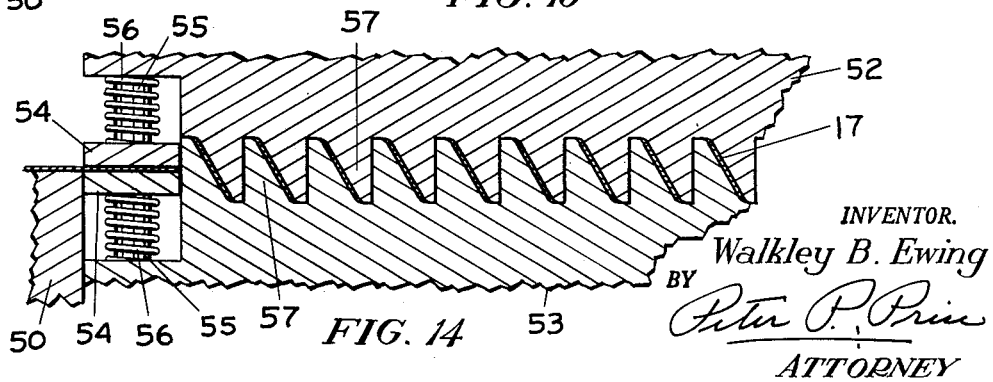
FIG. 14 is an enlarged, fragmentary, sectional elevation view of the dies shown in FIG. 12 in fully closed position.

When the dies are fully open, the clamping fingers 54 are separated sufficiently that the clamping fingers clear the panel a sufficient distance to permit the louvers formed in the sheet to freely pass between them. As the dies close, the clamping fingers 54 engage and firmly secure the sheet 44 before the teeth 57 engage it. As the dies continue to close, leading edges of the teeth 57 shear the panel to form the spaced, parallel slits 34. Thereafter, the progressive closing action of the dies rotates the ribbons or strips created by this initial slitting step about the centerlines of the strips to form the louvers 17. The teeth 57 on the upper and lower dies are so formed that one face is straight and the other is inclined to the angle at which it is desired to incline the louvers. When the dies are fully closed, as illustrated in FIG. 14, the louvers are rotated into their final position between the inclined sides of the teeth 57. Again, as with the roll dies, the rotation of the louvers 17 is normally carried slightly further than the ultimate slope it is desired to give to the louvers to account for spring back.

The louvers having been formed, the dies 52 and 53 are parted, and the driving rollers 51 actuated to push the section of formed sheet out of the dies and to position a new section for repetition of the operation. This entire operating cycle is comparatively short. Therefore, the reciprocating die arrangement illustrated in FIGS. 11 through 14 may be used for rapid production of the louvered material.

It will be recognized that both the machine equipped with the die drums 40 and 41 and a machine equipped with the reciprocating dies 52 and 53 can be made to produce eclipse elements having alternate louvered sections and imperforate sections. In the case of the drums 40 and 41, the only thing that need be done to make this change would be to leave the teeth sections 42a or the teeth sections 42 blank whereby the die drums, as they are rotated, alternately produce a louver group and an imperforate section. This could be done by fabricating a completely new set of die drums. Also, it is entirely possible to so design the die drums 40 and 41 that they have detachable, individual die sections mounted on the periphery, each of which may be independently removed. In this case, it would merely be necessary to remove those sections which are not required when portions of the panel are to be passed through without a forming operation. If this arrangement is employed, a single pair of die drums may be adapted to produce both types of eclipse elements.

In the case of the reciprocating dies, the same thing could be done. That is, the surface of the dies provided with teeth could be made detachable and thus either the portion having the teeth 57 or the portion having the teeth 58 could be removed and the sheet thereby would be formed only by the remaining teeth. At the same time, on each movement of the panel indexed by the rotation of the feed roll 51, a louvered section and an imperforate section would be formed. It is also entirely feasible to form the reciprocating die with only one bank of teeth whereby, on each cycle of the die, louvers are formed and the imperforate areas are created by proper indexing of the feed roll 51 so that they pass sufficient material through the dies while open to produce the imperforate sections. Either method has been carried out in one form or another in the sheet metal industry. Therefore, it is not believed necessary to illustrate such machines in detail.

Another method of producing sheet material having alternate groups of alternately inclined louvers is to pass the material through a reciprocating die in one direction, forming all the louvers inclined in one direction. The sheet could then be turned end for end and passed through again to form the louvers inclined in the opposite direction. This arrangement is limited, however, because it requires the number of louvers in each group to be identical. This is not the case in the panels of the eclipse member illustrated in FIG. 1.

Irrespective of the type of machine utilized for the purpose of forming the louvers, the material, as it emerges from the machine, consists of either sheets or a continuous strip. This material may then be passed through any suitable machine equipped to corrugate this sheet into the eclipsing element. Such a machine would simply consist of a suitable mechanism, such as dies, capable of bending the sheet into the sawtooth shape. The material may be cut into the desired lengths either before or after corrugation. The latter is considered preferable because it permits continuous mass production of the eclipsing element irrespective of particular skylight sizes.

The eclipsing element, after corrugation, is of sufficient strength that it will, if supported from beneath, retain its shape. Thus, when it has been cut to the proper size to be received into the skylight sandwich, it is merely placed in the chamber 18 between the sheets 11 and 12. These sheets are then glazed together, thus sealing the eclipsing element 14 between them.

The eclipsing element when seated between the two sheets will generate substantial quantities of heat within the skylight unit. This will be particularly true where portions of the upper surface of the eclipsing element are rendered non-reflective as by coating with a dull black finish. This will cause absorption of considerable heat energy from the solar radiation. To prevent excessively high temperatures being generated within the skylight panel, it will be preferable in some cases to provide some type of ventilation system whereby air may be passed through the panels for the purpose of carrying off this heat. To this end, one or more openings 60 (FIG. 3) are provided in each end of the panel whereby a stream of air may be passed through the sheet to carry off the heat. This air may be provided by a suitable small fan, with the air being passed through a suitable filter such as fiber glass or cotton fibers to filter out any solid impurities. Where several of the skylight panels 10 are placed in abutting relationship, the apertures 60 may be aligned from one panel to another to form a continuous flow path for the cooling air.

Partially because the sheet material utilized to make the eclipse element is, when formed into the sawtoothed structure, sufficiently self supporting that no additional supporting frame or other structure is required and partially because the louvers 17 can be made both narrow and from very thin stock, the entire height of the eclipsing element 14 may be less than an inch. This permits the construction of a double glazed, skylight sandwich of reasonable thickness. The thin gauge material permits the bends at the juncture of the panels 15 and 16 to be made over a small radius, thus both reducing the height of the eclipsing element and substantially narrowing the width of the imperforate area necessary for forming the corrugation bends. This increases the light transmitting efficiency of the eclipsing element. By adapting the basic material of the eclipsing element to continuous high speed manufacture, the relative cost of the material is kept within reasonable limits. Thus, the incorporation of this eclipsing element within a double glazed skylight panel will not substantially increase its cost.

Modifications

Figure 15:
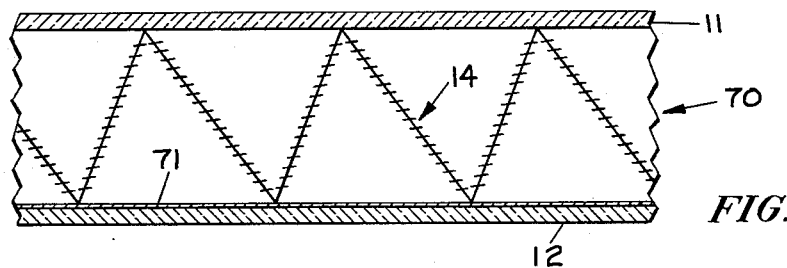
FIG. 15 is a fragmentary, partially schematic, sectional elevation view of a modified skylight employing this invention.

It is possible to make several modifications of the double glazed skylight with the objective of reducing the thermal conductivity of the unit. The skylight 70 illustrated in FIG. 15 is similar to the skylight 10 illustrated in FIG. 1, having upper and lower light transmitting panels 11 and 12 respectively enclosing an eclipsing element 14. The eclipsing element 14, however, is spaced from the lower panel 12 by a translucent web 71 of low thermal conductivity. The web 71 may be a suitable, translucent plastic or preferably it is a sheet of woven filamentary glass of intermediate mesh size. Any plastic used under these circumstances must be characterized by stability in the presence of ultra violet light and relatively high ambient temperatures.

The web 71 prevents the heat generated in the eclipsing element 14 from being transmitted to the inner or lower panel 12. It also serves as a thermal barrier against heat loss into the interior of the panel on cloudy winter days. When the web 71 is used, the lower panel 12 may be transparent because of the diffusing effect of the web 71.

Figure 16:
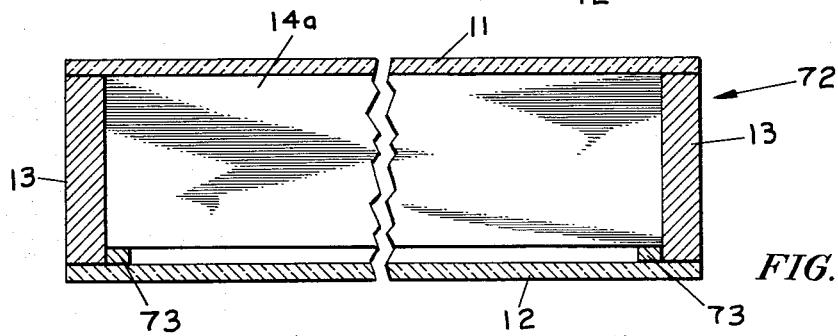
FIG. 16 is a fragmentary, partially schematic, sectional elevation view of a further modified skylight employing this invention.

In FIG. 16 another form of thermal barrier is shown. In this case, the skylight 72 consists of upper and lower light transmitting panels 11 and 12 respectively supported by a peripheral frame 13. The eclipsing element 14a, such as that shown in FIG. 2, is supported along its edge margins by spaced strips 73 which either rest upon the lower panel 12 or are secured to the side members of the frame 13.

The strips 73 may be of a rigid material such as wood or metal. Preferably, however, they are of a compressible material or are resilient such as a plastic tube. This permits the eclipsing element 14a to be pushed down slightly by the upper panel 11, thus, firmly locking it in place.

The strips 73 space the eclipsing element 14a from the lower panel 12. This prevents the eclipsing element from transmitting its heat by conduction to the lower panel 12 on sunny days and from conductively absorbing heat from the lower panel on cold, cloudy days.

Figure 17:
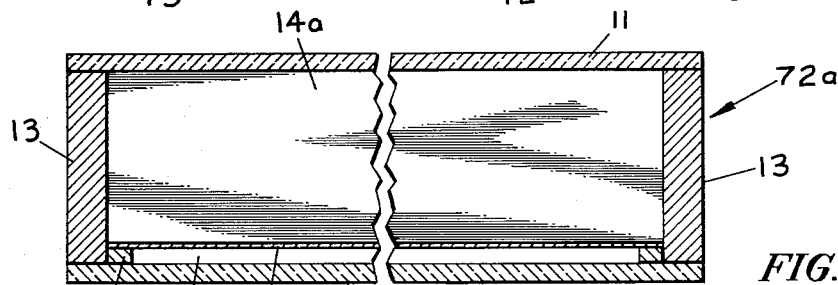
FIG. 17 is a fragmentary, partially schematic, sectional elevation view of a still further modified skylight employing this invention.

The skylight 72 illustrated in FIG. 17 is very similar to the skylight 72. The only difference is the provision of a thin web 74 of either translucent or transparent material at the bottom surface of the eclipsing element 14a. This web may be a thin plastic film, stretched between the strips 73. It may also be mounted by being stretched and adhesively bonded to the bottom of the eclipsing element 14a. Its use creates a dead air chamber 75 immediately above the inner or lower panel 12. The chamber 75 substantially reduces convective heat transfer to and from the lower panel 12.

It will be recognized that either of the eclipsing elements 14 or 14a may be interchangeably used in any of the skylight constructions 70, 72 and 72a.

Figure 18:
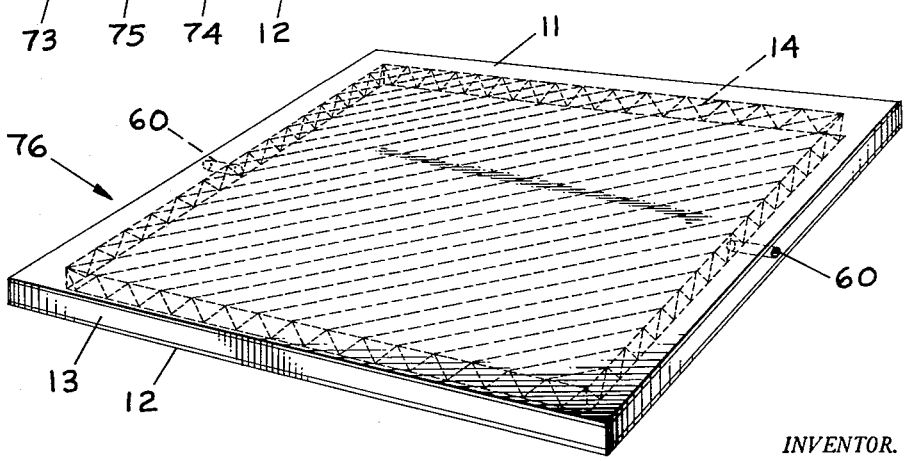
FIG. 18 is an oblique view of a dual pane skylight having an eclipsing member arranged on the bias enclosed therein.

FIG. 18 illustrates a modified arrangement of the skylight 10 illustrated in FIG. 3. In the skylight panel 76, the eclipsing element 14 is arranged on the bias. This arrangement is designed for buildings in which it is impractical to align the skylights north and south. When this occurs the center of the arc traversed by the sun is inclined to the axis of the skylight but it can be maintained in its proper symmetrical relationship to the ridges of the eclipsing element by this bias arrangement. Thus, the correct orientation and the full shading efficiency of the eclipsing element is retained within the units while the skylight panels as a whole may be installed in the roof in a conventional manner.

Skylight panels equipped with this type of eclipsing element will be far more efficient. For all practical purposes, direct solar radiation will be totally eclipsed while a substantial portion of the indirect and diffused sky light will be admitted to the enclosure. By totally eclipsing the direct solar radiation, both the glare and the heat attendant the use of the skylights are eliminated. This makes the skylight a much more desirable form of fenestration. Such a unit requires no adjustment. It is true that under certain conditions such as early morning and late afternoon a certain amount of sunlight may be able to enter through the eclipsing elements. The angle of the sun during these periods, however, is so low that it will not result in any serious glare nor will it generate any appreciable heat.

While this invention has been illustrated as applied to a horizontal skylight, it will be recognized that it may be, with equal facility, applied to inclined skylights. In some cases, such applications may require the louvers 17 and 17a to be inclined at somewhat different angles. It will be recognized that this may be done by the use of dies having suitably shaped teeth. Such a change will not depart from the principles of this invention.

These and other modifications of this invention which do not depart from the principles thereof are to be considered as included in the hereinafter appended claims unless these claims by their language expressly state otherwise.

I claim:

1. A skylight panel for intercepting direct solar radiation, said panel comprising: a panel characterized by a plurality of perforate sections, said web being corrugated to form a sheet-like eclipsing element lying on a plane and having alternately generally parallel panel walls extending upwardly from said plane, adjacent ones of said walls being upwardly convergent from said plane forming a plurality of teeth arranged in parallel rows along said plane, a pair of light transmitting sheets having said eclipsing element sandwiched therebetween each of said perforate sections having a plurality of equidistantly spaced louvers, said perforate sections forming at least one of each of said adjacently disposed panel walls of each tooth, said louvers being of substantially greater width than thickness, parallel to each other in a direction along said rows, inclined to the panel wall in which they are located and defining parallel slot-like light transmitting apertures therebetween extending in a direction along said rows, when said skylight panel is generally horizontal said louvers forming direct sunlight interception members inclined from the plane of said light transmitting sheets in a direction to present their broad surfaces toward the source of direct sunlight and adapted to occlude a substantial portion of direct sunlight, a panel of thermally non-conductive material between said eclipsing element and the one of said light transmitting sheets remote from the source of direct sunlight, the bases of said teeth of the eclipsing element engaging both the thermally non-conductive panel and the one of said light transmitting sheets adjacent the source of direct sunlight, frame means at the margin of said light transmitting sheets for securing said sheets and holding them in said spaced relationship.

2. A skylight panel for intercepting direct solar radiation, said panel comprising: a panel characterized by a plurality of perforate sections, said web being corrugated to form a sheet-like eclipsing element lying on a plane and having alternately generally parallel panel walls extending upwardly from said plane, adjacent ones of said walls being upwardly convergent from said plane forming a plurality of teeth arranged in parallel rows along said plane, a pair of light transmitting sheets having said eclipsing element sandwiched therebetween each of said perforate sections having a plurality of equidistantly spaced louvers, said perforate sections forming at least one of each of said adjacently disposed panel walls of each tooth, said louvers being of substantially greater width than thickness, parallel to each other in a direction along said rows, inclined to the panel wall in which they are located, and defining parallel slot-like light transmitting apertures therebetween extending in a direction along said rows, when said skylight panel is generally horizontal said louvers forming direct sunlight interception members inclined from the plane of said light transmitting sheets in a direction to present their broad surfaces toward the source of direct sunlight and adapted to occlude a substantial portion of direct sunlight, a panel of open mesh woven filamentary glass between said eclipsing element and the one of said light transmitting sheets remote from the source of direct sunlight, the bases of said teeth of the eclipsing element engaging both the open mesh panel and one of said light transmitting sheets adjacent the source of direct sunlight, frame means at the margin of said light transmitting sheets for securing said sheets and holding them in said spaced relationship.

3. A skylight panel for intercepting direct solar radiation, said panel comprising: a panel characterized by a plurality of perforate sections, said web being corrugated to form a sheet-like eclipsing element lying on a plane and having alternately generally parallel panel walls extending upwardly from said plane, adjacent ones of said walls being upwardly convergent from said plane forming a plurality of teeth arranged in parallel rows along said plane, a pair of light transmitting sheets having said eclipsing element sandwiched therebetween each of said perforate sections having a plurality of equidistantly spaced louvers, said perforate sections forming at least one of each of said adjacently disposed panel walls of each tooth, said louvers being of substantially greater width than thickness, parallel to each other in a direction along said rows, inclined to the panel wall in which they are located, and defining parallel slot-like light transmitting apertures therebetween extending in a direction along said rows, when said skylight panel is generally horizontal said louvers forming direct sunlight interception members inclined from the plane of said light transmitting sheets in a direction to present their broad surfaces toward the source of direct sunlight and adapted to occlude a substantial portion of direct sunlight, a panel of thermally non-conductive material between said eclipsing element and the one of said light transmitting sheets, remote from the source of direct sunlight, the bases of said teeth of the eclipsing element engaging the thermally non-conductive panel and the upper one of said light transmitting sheets adjacent the source of direct sunlight respectively, said panel being spaced from the one of said light transmitting sheets remote from the source of direct sunlight whereby a chamber is defined between said panel and said sheet.

References Cited in the file of this patent

UNITED STATES PATENTS

| | | |
|---|---|---|
| 173,722 | Hayes | Feb. 22, 1876 |
| 178,103 | Bracher | May 30, 1876 |
| 717,783 | Wadsworth | Jan. 6, 1903 |
| 1,650,055 | Tregillus | Nov. 22, 1927 |
| 1,931,420 | Wakefield | Oct. 17, 1933 |
| 1,957,279 | Linke | May 1, 1934 |
| 2,196,020 | Lyon | Apr. 2, 1940 |
| 2,319,225 | Grebe | May 18, 1943 |
| 2,382,566 | Heckman | Aug. 14, 1945 |
| 2,518,044 | Matteson | Aug. 8, 1950 |
| 2,545,907 | Watkins | Mar. 20, 1951 |
| 2,546,335 | Friend | Mar. 27, 1951 |
| 2,596,997 | Harter | May 20, 1952 |
| 2,689,387 | Carr | Sept. 21, 1954 |

FOREIGN PATENTS

| | | |
|---|---|---|
| 28,877 | Great Britain | of 1897 |
| 556,218 | Great Britain | Sept. 24, 1943 |
| 234,549 | Switzerland | Jan. 16, 1945 |